No. 727,948. PATENTED MAY 12, 1903.
G. M. HIGGINS.
MOVING PICTURE APPARATUS.
APPLICATION FILED SEPT. 6, 1902.
NO MODEL. 3 SHEETS—SHEET 1.
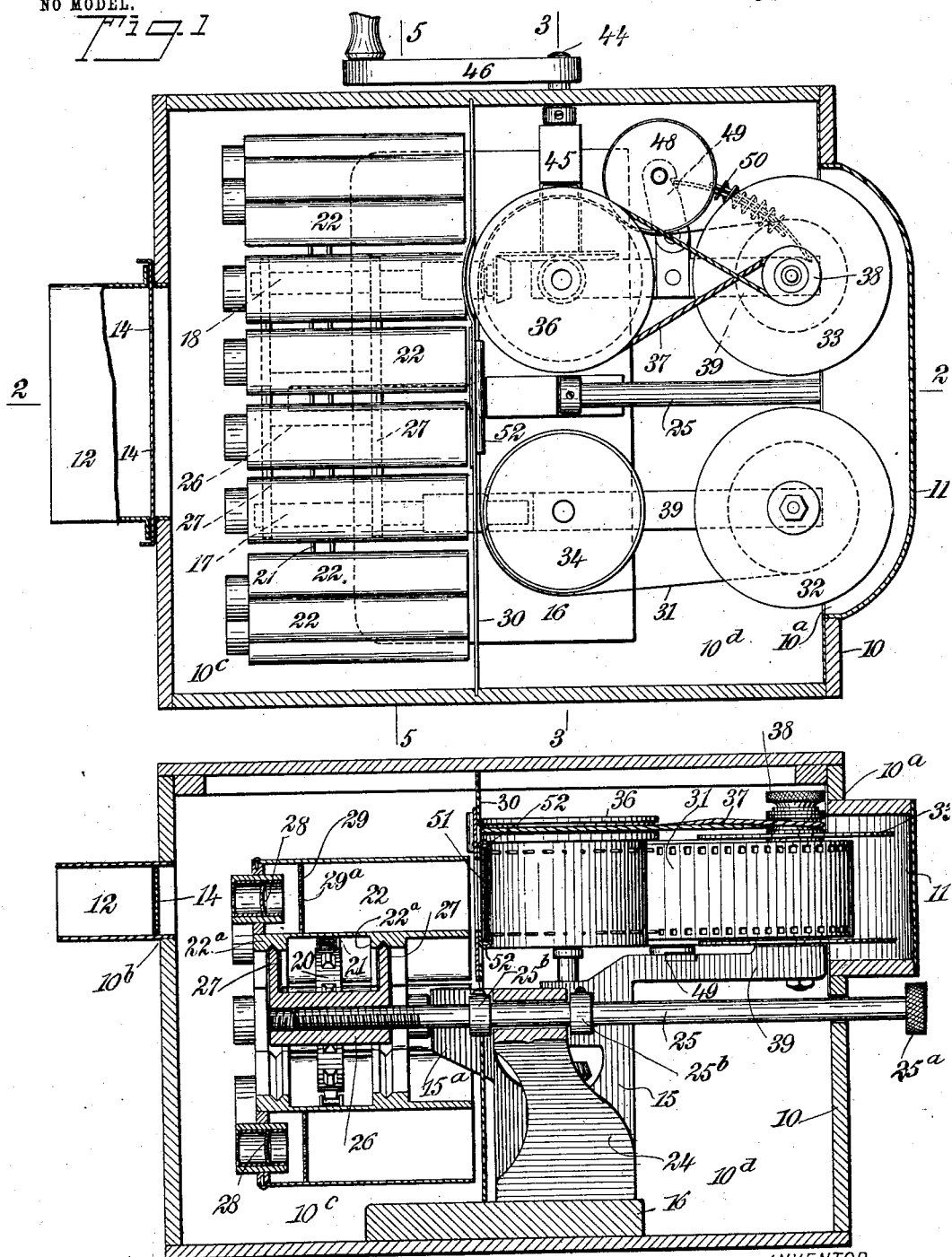
WITNESSES:
INVENTOR
George M. Higgins
BY
ATTORNEYS.

No. 727,948. PATENTED MAY 12, 1903.
G. M. HIGGINS.
MOVING PICTURE APPARATUS.
APPLICATION FILED SEPT. 6, 1902.
NO MODEL. 3 SHEETS—SHEET 2.

WITNESSES:
J. A. Brophy
Isaac D. Owens

INVENTOR
George M. Higgins
BY
ATTORNEYS.

No. 727,948. PATENTED MAY 12, 1903.
G. M. HIGGINS.
MOVING PICTURE APPARATUS.
APPLICATION FILED SEPT. 6, 1902.
NO MODEL. 3 SHEETS—SHEET 3.
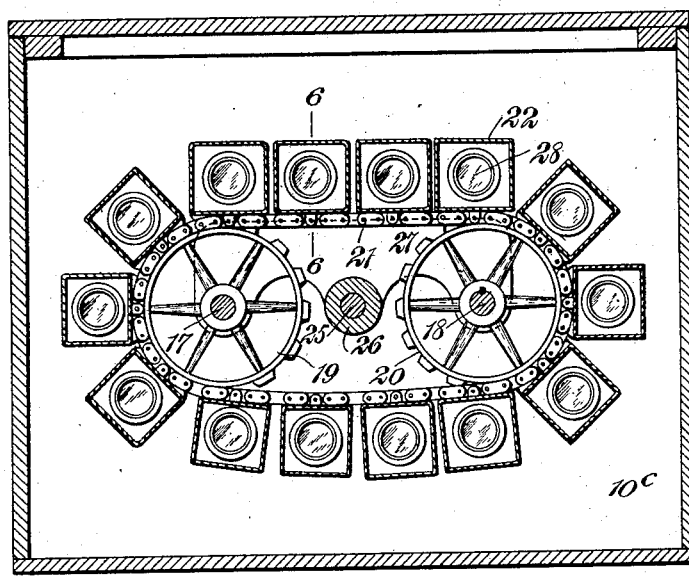
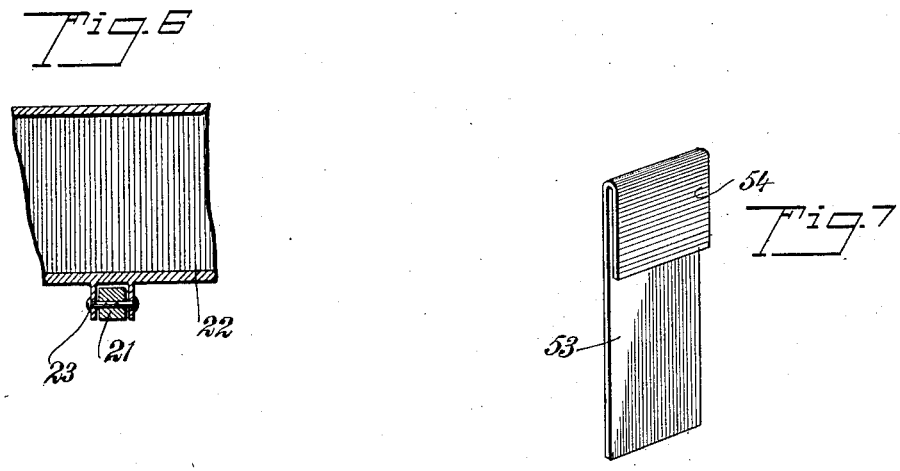
WITNESSES:
J. A. Brophy
Isaac B. Owens
INVENTOR
George M. Higgins
BY Munn
ATTORNEYS.

No. 727,948.

Patented May 12, 1903.

UNITED STATES PATENT OFFICE.

GEORGE MORRIS HIGGINS, OF CLEVELAND, OHIO, ASSIGNOR OF ONE-HALF TO WALTER A. WOLAND, OF FREMONT, OHIO.

MOVING-PICTURE APPARATUS.

SPECIFICATION forming part of Letters Patent No. 727,948, dated May 12, 1903.

Application filed September 6, 1902. Serial No. 122,322. (No model.)

*To all whom it may concern:*

Be it known that I, GEORGE MORRIS HIGGINS, a citizen of the United States, and a resident of Cleveland, in the county of Cuyahoga and State of Ohio, have invented a new and Improved Moving-Picture Apparatus, of which the following is a full, clear, and exact description.

This invention relates to an apparatus for taking a number of successive pictures of a moving object, so that the moving picture may be reproduced in the well-known manner. The apparatus is also capable of having its operation reversed, thus to be used as a lantern in reproducing the picture.

The prime feature of the invention lies in the arrangement of a number of lenses which are mounted to move continuously in an endless path parallel with and at a speed proportional to that of the moving film, these parts moving past the light-admitting orifice, so that the said lenses operate successively upon the film, and the parts moving in exact time with each other insures accurate impressions and avoids that objectionable appearance of vibration which is common in apparatus of this sort, owing to the intermittent motion formerly given the film.

The invention also involves an arrangement facilitating the reproduction of the colors of the subject taken.

Various minor features are also involved, as will be fully pointed out hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 3:
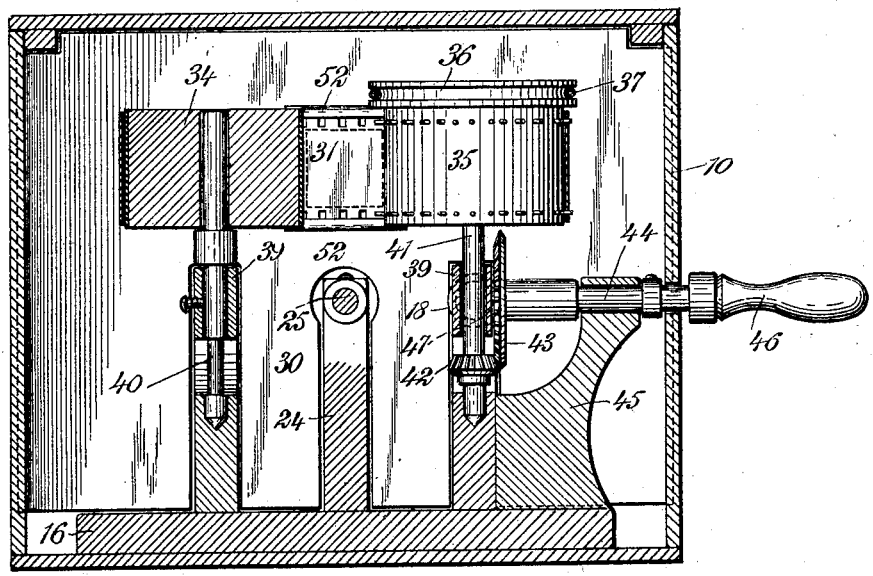
Figure 4:
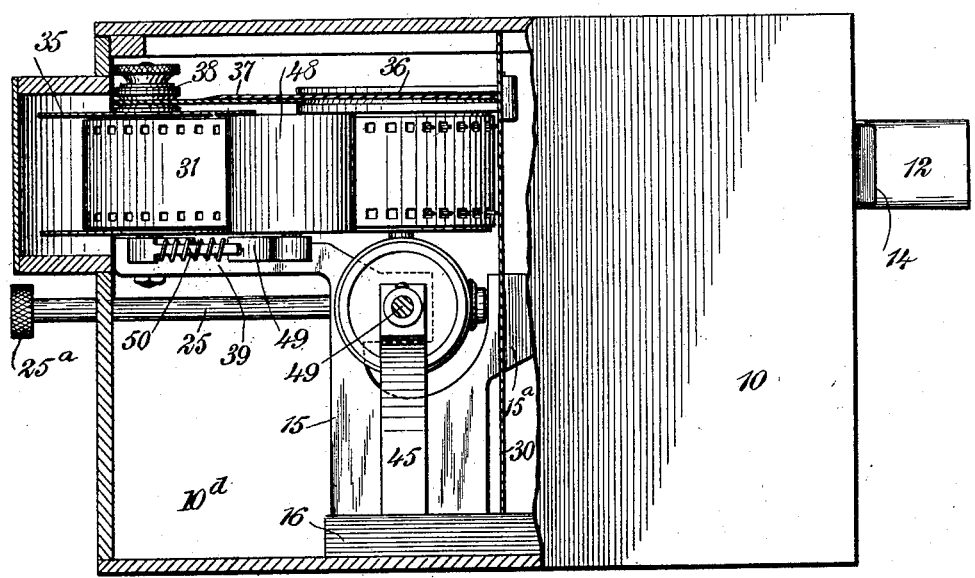

Figure 1 is a plan view of the apparatus, the casing being shown in section. Fig. 2 is a vertical section on the line 2 2 of Fig. 1. Fig. 3 is a transverse section on the line 3 3 of Fig. 1. Fig. 4 is a side elevation with parts of the casing broken away to show the interior mechanism. Fig. 5 is a section on the line 5 5 of Fig. 1. Fig. 6 is a section on the line 6 6 of Fig. 5, and Fig. 7 is a detail view of an attachment which may be employed in the apparatus.

The apparatus is provided with a suitable casing 10, in the rear of which is formed an opening $10^a$, closed by a hood 11, which is removably placed in position and which facilitates entering the film into and removing it from the interior of the casing.

$10^b$ represents the light-admitting orifice at the front of the casing 10, and in this orifice is placed a flattened tube 12, having sliding closures 14, by means of which the tube may be completely closed, as shown in Fig. 1, or an opening of any size desired may be formed centrally in the tube.

15 indicates brackets which are mounted on a base 16 within the casing 10 and which have forward extensions $15^a$, carrying, respectively, shafts 17 and 18. The shaft 17 is mounted fixedly, and the shaft 18 is mounted to rotate. Both of these shafts extend forwardly into the lens-compartment $10^c$ of the casing 10, and they carry, respectively, sprocket-wheels 19 and 20, of which the wheel 19 is loose on the shaft 17 and the wheel 20 fast to the shaft 18. These wheels are transversely alined and carry an endless sprocket-chain 21, to which are connected the lens-cases 22 through the medium of lugs and pins 23. (See Fig. 6.) The lens-cases 22 are arranged longitudinally of the apparatus and side by side, the chain 21 connecting said cases in an endless line, and when the shaft 18 is revolubly driven said cases are caused to move around the wheels 19 and 20, and are thus successively presented to the orifice in the tube 12.

A bracket 24 rises from the base 16 and carries revolubly a shaft 25, the rear end of which projects beyond the casing 10 and is provided with a milled thumb-wheel $25^a$, facilitating the manual rotation of the shaft. Collars $25^b$ on the shaft 25 prevent the longitudinal movement of the shaft. Said shaft has its forward end projected into the lens-compartment $10^c$ and threaded to engage a nut 26, which nut carries two transversely-disposed plates 27. These plates slide loosely on the shafts 17 and 18 and have their upper edges straight and arranged in horizontal position to engage in the notches of enlargements $22^a$, formed on the lens-cases 22. These plates 27 therefore support the lens-cases, which meet in a horizontal plane, and prevent them from sagging between the wheels 19 and 20. Further, the wheel 19 being loose on the shaft 18 these wheels 19 and 20 are free to move longitudinally of their shafts, and by turning the screw 25 the nut 26 may be advanced or retracted, and through the medium of the plates 27 and enlargements 22$^a$ the set of lens-cases may be moved forward or backward, so as properly to focus the lenses. These parts 25, 26, and 27 serve, therefore, a twofold function.

28 indicates the lenses, which are carried in the forward ends of the lens-cases 22 and which may be of any form suitable to the purpose in hand. Just rearward of the lenses 28 are the colored diaphragms 29, which are one for each lens and which are placed in the cases, as shown. These diaphragms are formed with central apertures 29$^a$, as shown, and are located just back of the respective lenses. Said diaphragms are formed of glass or other transparent material and are colored successively with the three primary colors, such as red, yellow, and blue or shades thereof. Therefore the diaphragms are arranged in groups of three, the members of which are respectively of the colors named, and as the lenses are moved these colors are alternated past the light-admitting orifice of the case 10. The central apertures in the diaphragms are of such size that the unobstructed light passing through these apertures acting in conjunction with the colored light passing through the rest of the diaphragm will produce the desired actinic effect upon the sensitive surface of the film. The colored light is not alone sufficiently active chemically to produce the effect with sufficient speed for kinetographic work, and consequently the central aperture is provided to give the additional light necessary. The film when impressed with the images in this manner and when run through the reproducing operation in connection with colored screens similar to those employed in making the exposure will reproduce the picture in its natural colors, all of which will be understood from the prior art. (See, for example, the patent to Lee and Turner for a kinetographic camera, No. 645,477, granted March 17, 1900.)

A vertical partition 30 is arranged in the casing 10, dividing it into the lens-chamber 10$^c$, before described, and the film-chamber 10$^d$.

31 indicates the sensitized film; 32, the reel on which is wound the unexposed film.

33 is a reel carrying the exposed part of the film, and 34 and 35 represent the idler-drums over which the film is drawn and which serve to hold the film in close proximity to the rear side of the partition 30. The drum 35 is provided with a pulley 36, and over this pulley passes a belt 37, which is crossed and extended to a pulley 38, having suitable connection with the reel 33, so as to drive the reel 33 from the pulley 35. 39 indicates brackets which are mounted on the base 16 and which carry, respectively, the shafts 40 and 41 of the drums 34 and 35. The shaft 41 has a bevel-gear 42 thereon, and this is in mesh with a corresponding gear 43, fastened on the drive-shaft 44. This drive-shaft extends horizontally and transversely and is mounted to turn in a bracket 45. Outside of the casing 10 the shaft 44 is provided with a crank 46 for facilitating the rotation of the shaft, and by these means the drums 35 and 33 are driven. The shaft 18 extends rearwardly to the bracket 39 and carries a bevel-gear 47, which is meshed with the gear 43, and by this arrangement the shaft 18 is driven synchronously with the film. As best shown in Fig. 1, the film is pressed snugly against the drum 35 by an idler-roller 48, which is carried on a swinging arm 49, and said arm is pressed by a spring-actuated extensible rod 50, causing the drum to hold the roller 48 pressed snugly against the film, which in turn is held against the drum 35.

If desired, the reel 32 may be substituted by a box or case in which the film is wound and from which it may be withdrawn by the action of the reel 33. This device is separate from the other parts of the apparatus, and being opaque to prevent exposure it presents the advantage of allowing the apparatus to be charged in exposed places, and also it dispenses with one moving part of the apparatus—$i. e.$, the reel 32.

In the partition 30 is formed an orifice 51, which is in line with the tube 12, and through which orifice the film is exposed. 52 indicates channel-guides, which are arranged facing each other horizontally above and below the orifice at the rear side of the partition, and through which guides the film runs. This holds the film snugly against the back of the partition. The area of the opening 51 may be regulated by means of aprons 53, (shown in Fig. 7,) and having bent upper ends 54, adapted to be placed over the top of the partition 30, so that the aprons will hang down over or at one side of the opening 51. These aprons may be adjusted with respect to the opening so as to increase or diminish its size. In taking pictures three aprons will be employed. One will be arranged at each side of the opening in front of the film, so that by proper adjustment of these two aprons the width of the exposure-orifice may be regulated, and the other will be arranged back of the film opposite the exposure-orifice to prevent the light from penetrating the film-compartment 10$^d$. Now it may be observed that by proper adjustment of the first two aprons the speed of exposure—that is to say, the area of film uncovered—may be regulated properly to suit the class of work involved. In using the apparatus to reproduce the pictures these aprons are unnecessary, and hence they are made removable.

In the use of the invention the apparatus is placed before the object to be photographed and the parts are adjusted as shown in the drawings, excepting that the slides 14 are moved apart, so as to form the necessary opening in the tube 12. The shaft 44 is now set in motion, which causes the film to be advanced and the chain 21, carrying the lenses, to be moved in time with the film. The parts are so relatively arranged that the film is moved at exactly the speed of the movement of the images projected from the lenses. As each lens is moved into alinement with the tube 12 and opening 51 an exposure of the film is effected and the image is impressed thereon. As the next lens is advanced a second impression is made, and so on throughout the operation of the machine. It will be observed that this apparatus avoids that intermittent movement which has been heretofore employed and which causes the vibrating appearance of the picture when reproduced. The film thus formed will have the successive progressive images necessary to reproduce the moving picture photographed, which reproduction may be effected in any desired manner. A transparent film bearing moving-picture images may be placed in the apparatus in place of the sensitized film and a light placed back of said film, and thus a reproducing apparatus will be formed. In other words, the operation may be reversed to form the apparatus into a kinetographic lantern. For this purpose the closure 11 may be removed and the light admitted into the rear of the apparatus through the aperture 10ª in the case 10. It then passes through the film and through the orifice 51, where it enters the lens-cases and passes the screens 29 and lenses 28, the image being projected through the tube 12. It will be observed that in this manner a colored picture may be produced, since the screen 29 then serves as the reproducing-screen instead of the photographic screen, as in the other operation.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. In a moving-picture apparatus, the combination of a plurality of lenses mounted to move successively past the light-admitting orifice, means for moving the film, gearing for driving said lens and film moving means synchronously, and a colored screen for each lens, the colored screens moving with the lenses.

2. In a moving-picture apparatus, the combination of a plurality of lenses mounted to move successively past the light-admitting orifice, means for moving the film, gearing for driving said lens and film moving means synchronously, and a colored screen for each lens, the colored screens moving with the lenses, each of said screens having a central aperture therein, for the purpose specified.

3. In a moving-picture apparatus, the combination of means for carrying the film, a sprocket-chain, a plurality of lens-cases connected with certain links of the chain to move therewith, a lens in each case, sprocket-wheels on which the chain is carried, and gearing for driving the chain and said film-carrying means synchronously.

4. In a moving-picture apparatus, means for carrying the film, comprising an idler-drum, reels to which the ends of the film are respectively attached, gearing for connecting the idler-drum with the winding-reel, an idler-roller serving to press the film against the idler-drum, means actuating the idler-roller, and means for driving the idler-drum.

5. In a moving-picture apparatus, the combination with the film-carrying means, of a lens, a case therefor, means for mounting the case, said means permitting the case to move toward and from the film, a screw, a nut with which the screw coacts, and a connection between the nut and the lens-case to adjust the lens toward and from the film.

6. In a moving-picture apparatus, the combination with the film-carrying means, of sprocket-wheels, an endless chain run over said wheels, lens-cases attached to the chain, a lens carried in each case, and a supporting plate or member over which the lens-cases run, whereby to prevent them from sagging.

7. In a moving-picture apparatus, the combination with the film-carrying means, of sprocket-wheels, an endless chain run over the wheels, lens-cases attached to the chain, a lens carried in each case, a supporting plate or member over which the lens-cases run, whereby to prevent them from sagging, and means for adjusting said plate toward and from the film to focus the lens.

8. In a moving-picture apparatus, the combination with the film-carrying means, of sprocket-wheels, an endless chain run over the wheels, lens-cases attached to the chain, a lens carried in each case, a supporting plate or member over which the lens-cases run whereby to prevent them from sagging, and means for adjusting said plate toward and from the film to focus the lens, said means comprising a screw mounted to turn and a nut in connection with said plate.

9. In a moving-picture apparatus, the combination with the film-carrying means, of a plurality of lens-cases, lenses in said cases, a chain to which the cases are connected, wheels over which the chain runs, a plate having a straight edge over which the lens-cases run to prevent them from sagging, a nut connected with the plate, and a screw arranged to turn and working with the nut.

10. A moving-picture apparatus comprising a wall with a film-exposing orifice therein, a lens arranged to travel past said orifice, and means for varying the area of the orifice in the direction of the movement of the lens.

11. A moving-picture apparatus comprising a wall with a film-exposing orifice therein, an apron lying adjacent to the wall and adjustable over and from said orifice to vary the area thereof, and a lens mounted to move past the orifice.

12. A moving-picture apparatus comprising a wall with a film-exposing orifice therein, two aprons arranged adjacent to said wall at opposite sides of said orifice and adjustable toward and from each other for the purpose specified, and a lens mounted to move past the orifice.

13. In a moving-picture apparatus, the combination of a lens, a film, said parts being relatively movable, and a color-screen having an aperture therein to permit the passage of unobstructed light-rays, for the purpose specified.

14. In a moving-picture apparatus, the combination of a lens, a film, said parts being relatively movable, and a color-screen having a centrally-situated aperture therein to permit the passage of unobstructed light-rays, for the purpose specified.

15. In a moving-picture apparatus, the combination of a plurality of lenses adapted to move successively past the light-admitting orifice, means for moving the film, gearing for driving said lenses and film-moving means synchronously, and a color-screen for each lens, said screens moving with the lenses and each having an aperture therein, for the purpose specified.

16. In a moving-picture apparatus, the combination with film-carrying means, of a plurality of moving lenses, and a color-screen for each lens.

17. In a moving-picture apparatus, the combination with the film-carrying means, of sprocket-wheels, an endless chain run over said wheels, lenses carried by the chain, a supporting plate or member over which the lenses run, whereby to prevent them from sagging, and means for adjusting said plate toward and from the film to focus the lenses.

18. In a moving-picture apparatus, the combination with the film-carrying means, of an endless chain, means for carrying and driving the same, lenses supported on the chain, and a supporting plate or member over which the lenses run, whereby to prevent them from sagging.

19. In a moving-picture apparatus, the combination with the film-carrying means, of an endless chain, means for carrying and driving the same, lenses supported on the chain, a supporting plate or member over which the lenses run, whereby to prevent them from sagging, and means for adjusting the supporting-plate toward and from the film, to focus the lens.

20. In a moving-picture apparatus, the combination of a film-carrying means, an endless chain, means for mounting and driving the same, lenses supported by the chain, a supporting plate or member over which the lenses run, whereby to prevent them from sagging, a screw mounted to turn, and a nut working on the screw and having connection with the said supporting-plate, for the purpose specified.

21. The combination of a lens, a film-carrying means, and a color-screen having an aperture therein to permit the passage of unobstructed light-rays, for the purpose specified.

In testimony whereof I have signed my name to this specification in the presence of two subscribing witnesses.

GEORGE MORRIS HIGGINS.

Witnesses:
WALTER A. WOLAND,
JAY G. HART.